UNITED STATES PATENT OFFICE.

CLAUS A. SPRECKELS AND CHARLES A. KERN, OF NEW YORK, N. Y., ASSIGNORS, BY MESNE ASSIGNMENTS, TO FEDERAL SUGAR REFINING COMPANY, OF JERSEY CITY, NEW JERSEY, A CORPORATION OF NEW JERSEY.

PROCESS OF PURIFYING SUGAR AND SOLUTIONS THEREOF.

SPECIFICATION forming part of Letters Patent No. 722,158, dated March 3, 1903.

Application filed July 2, 1902. Serial No. 114,035. (No specimens.)

*To all whom it may concern:*

Be it known that we, CLAUS A. SPRECKELS and CHARLES A. KERN, citizens of the United States, and residents of the borough of Manhattan, city and State of New York, have invented certain new and useful Improvements in Processes of Purifying Sugar and Solutions Thereof, of which the following is a full and true description.

The object of this invention is to economically and quickly remove impurities from sugar or sugar solutions.

This invention is a specific form of the process described and claimed in our Letters Patent No. 698,150, dated April 22, 1902, for process of purifying sugar and solutions thereof. That patent covers, broadly, the employment of a sulfonated or sulfoöleaginous fluid defecating or cleansing agent for the treatment of impure sugar.

Our present invention relates to the employment with sugar or sugar solution of a fluid defecating or cleansing agent containing or composed of a sulfonated or sulfoöleaginous body dissolved in or mixed with hydrocarbon oil or hydrocarbon-oil mixture, preferably petroleum or petroleum derivative or mixture, such as kerosene-oil.

As stated in the aforesaid patent, the sulfonated or sulfoöleaginous bodies may be produced by the action of sulfuric acid or a mixture of acids containing sulfuric acid upon bodies—such as resins, rosin-oils, essential oils, fats, fatty oils, and fatty acids—in such proportions that there are no injurious effects upon the sugar from the sulfuric acid and compounds are produced which have greater absorbent properties for the earthy or metallic salts and for the invert sugar ordinarily found associated with sugar or sugar-bearing bodies and the caramel produced in the process of manufacture than has the sugar itself and subsequently separating the sugar from the defecating or cleansing composition containing the absorbed impurities.

We have discovered that important advantages are secured by the employment of a sulfonated fluid cleansing agent containing hydrocarbon oil, and our present invention is therefore limited to the use of such mixtures.

We believe we are the first to discover that the use of these hydrocarbon sulfonated defecating or cleansing agents result in such advantages.

In our said patent we have substantially stated the following as an example of the way in which a sulfonated or sulfoöleaginous material may be prepared for use: Mix sulfuric acid, preferably of 1.835 specific gravity, (66° Baumé,) or a mixture of acids containing sulfuric acid in the proportion of, say, fifty parts, by weight, of sulfuric acid or mixture of acids containing sulfuric acid with one hundred parts, by weight, of one or more bodies, of which resinous bodies, fats, fatty oils, and fatty acids and essential oils are examples. The sulfuric acid is added to the bodies gradually or, at all events, under such conditions that a low temperature will be maintained, the work being preferably carried out in a cooled receptacle and the mixture is allowed to stand for a few hours. The excess of acid is removed or neutralized either by the addition of alkali or by the addition of water or gravital separation. Hydrocarbon oil or a mixture containing hydrocarbon oil is added to the body produced as aforesaid. Preferably the sulfonated or sulfoöleaginous body produced as aforesaid is dissolved in the hydrocarbon oil, which may be added at any time. In the cases of palmitic acid, butyric acid, stearic acid, or rosin these substances may be liquefied to facilitate their treatment by the sulfuric acid or mixture of acids containing sulfuric acid by the addition of kerosene-oil. Ordinarily, however, the hydrocarbon oil or mixture will be added after we have sulfonated the body or bodies. The proportion and strength of acid above suggested may be used in sulfonating each and every one of the substances hereinafter mentioned; but in the cases of essential oils, such as turpentine, it will be preferable to considerably increase the proportion of the oil to the sulfuric acid or mixture of acids containing sulfuric acid even to the extent of doubling the same or more. The sulfonated or sulfoöleaginous body produced is, of course, in all cases fluid. The proportion and strength of acid may of course be varied in well-known ways, and other well-known acids may be mixed with the sulfuric acid without departure from our invention, it being borne in mind that the result is that the body when acted upon by the sulfuric acid and in the condition in which it is to be used will not contain sulfuric acid in any amount injurious to the sugar and will have an absorbent property for the impurities greater than the adherent properties of such impurities for the sugar itself.

The following are bodies which we have tested and found to be acted upon and to act in the manner described, viz: colophonium, (rosin,) rosin-oil, olive-oil, castor-oil, cotton-seed oil, cocoanut-oil, linseed-oil, rape-oil, peanut-oil, lard, tallow, cod-liver oil, fish-oil, (menhaden-oil,) lard-oil, oleic acid, stearic acid, palmitic acid, butyric acid, oil of turpentine; but all the substances above named are given as examples only of our invention.

Our invention also includes the employment of cleansing compositions containing an intimate mixture of hydrocarbon oil and sulfonated or sulfoöleaginous bodies made by treatment of mixtures of two or more of the above-mentioned bodies. We have obtained good results from the treatment of a considerable number of such mixtures, of which the following may be cited as examples: first, rosin-oil, castor-oil, and oleic acid; second, castor-oil, cotton-seed oil, and oleic acid; third, lard and rosin-oil; fourth, rosin-oil, oleic acid, and oil of turpentine; fifth, tallow and oil of turpentine.

As pointed out in our said patent, the bodies and mixtures above enumerated have common characteristics and when sulfonated act upon sugar and its impurities in analogous and equivalent ways. We include them all under the generic term "oleaginous bodies," and when acted on by sulfuric acid in the manner described we term the derivatives "sulfoöleaginous bodies." All the derivative cleansing agents mentioned are properly included also under the term "sulfonated bodies," whether properly and strictly called "oleaginous" or not.

When the operator employs a mixture of acids containing sulfuric acid, this mixture is to be treated, for the purposes of our invention, as the equivalent of sulfuric acid alone, since the latter body is the essential agent in the production of a sulfonated body.

As an example of the preparation of the new cleansing composition employed by us and assuming that a resinous body is to be acted upon, we recommend to proceed as follows: Take two parts, by weight, of a resinous body—rosin-oil being an example—and add while stirring the oil one part, by weight, of sulfuric acid, preferably mixing the acid with the oil gradually, or at all events under such conditions that a low temperature will be maintained. When acting on an essential oil, (such as commercial oil of turpentine,) we recommend that in producing a sulfonated derivative the operator take four parts of the essential oil to one part of the sulfuric acid or acid mixture. After the incorporation of the acid allow the mixture to stand for a few hours and then preferably remove or neutralize the excess of acid in the mixture. For this purpose we may neutralize the mixture by the addition of an alkali or mixture of alkalies, preferably carbonate of soda, caustic soda, carbonate of potash, caustic potash, or combinations thereof. When not neutralizing by the use of alkali, we proceed as follows: Add water about equal to the amount of oil in the original mixture and mix thoroughly. On standing the mixture separates into two layers, the upper fluid layer being the material in course of treatment and the lower consisting of water containing the surplus acid and other useless products, and we leave the mixture standing for several hours in a vessel properly arranged and then draw off the water containing superfluous acid, &c. To the mixture obtained by the addition of alkalies, as above described, or by the addition of water, as above described, add a solution of common salt and water to free the mixture from any remaining acid or water or excess of alkali when used. After each addition of salt and water we allow the mixture to settle and draw off the saline solution. The sulfonated body, with the excess of acid in the mixture removed or neutralized by any suitable method, results in a neutralized sulfonated body. When the mixture is practically free from water or from excess of alkali when used, we add thereto kerosene-oil or other hydrocarbon oil or a mixture containing hydrocarbon oil.

A cleansing or defecating liquid of the character hereinbefore specified and mixed with a considerable proportion of hydrocarbon oil or hydrocarbon-oil mixture intimately combined with a body sulfonated at a low temperature has distinct characteristics and properties for the purpose of defecating or cleansing sugar and is also, so far as we have been able to learn, a composition new in the arts. These characteristics are absorbent property for sugar impurities—such as invert sugar, caramel, and salts—superior to the adherence of such impurities to sugar itself; freedom from sulfuric acid in an amount injurious to sugar; the body is not oxidized, owing to maintaining a low temperature in its production; it mixes readily with hydrocarbon oils, such as petroleum-oil, when employing alkali to neutralize the acid. We have obtained good results by employing one part of caustic soda to each fifteen parts of the modified mixture. We have obtained good results by adding about fifty per cent. of kerosene-oil; but we do not state this as a fixed percentage, since it may be materially varied.

The use of an alkali, above described, for the purpose of neutralizing free sulfuric acid may result, as is well understood, in the production of sulfonic-acid salts or closely-allied salts in the defecating or cleansing liquid; but such salts so made are included by us under the general designation of "sulfonated" or "sulfoöleaginous" cleansing agents.

The amount of the composition used may be varied to suit the different qualities of the material being treated; but the mass of sugar-bearing material and cleanser should be semifluid at least, if not already so. In all cases there should of course be enough to absorb out the impurities. For example, we have obtained excellent results when treating raw sugar by employing eight pounds of cleanser to each ten pounds of raw sugar. As the composition has no injurious effect upon the sugar-crystals or sugar liquor, the quantity of composition may be increased as desired.

The new cleansing composition containing the intimate mixture of hydrocarbon oil and sulfonated or sulfoöleaginous body and the impurities may be separated from the impure sugar in accordance with the steps described in our Patent No. 698,150. Thus when cleansing a mass containing sugar-crystals the mixture of the composition, which is a non-solvent of sugar-crystals, and the material being treated is put into the centrifugal machine and the composition and the absorbed impurities are expelled from the mass. As stated in said patent and in our Patent No. 700,099, dated May 13, 1902, in order to remove any slight traces of our cleansing body or composition from a mass of sugar-crystals, as well as the solid substances, we may subject the mass to a further treatment.

Although we have described the method of separating the cleansing agent from the sugar-crystals by the use of a centrifugal, yet it must be understood that our invention is not limited to that specific method of separation, as any other method which will effect the separating result may be used.

We claim—

1. In the method of cleansing sugar from its impurities, the step which consists in mixing with the impure sugar a compound for cleansing sugar, containing hydrocarbon oil intimately mixed with a sulfonated body, substantially as described.

2. In the method of cleansing sugar from its impurities, the step which consists in mixing with the impure sugar a compound for cleansing sugar, containing hydrocarbon oil intimately mixed with a sulfoöleaginous body, substantially as described.

3. The method of cleansing sugar from its impurities, consisting in mixing with the impure sugar a compound for cleansing sugar, containing hydrocarbon oil intimately mixed with a sulfonated body, substantially as described, and then separating the said cleansing agent and impurities carried by it, from the sugar, substantially as described.

CLAUS A. SPRECKELS,
CHARLES A. KERN.

Witnesses:
TEILE H. MÜLLER,
STEPHEN EIGEN.